United States Patent [19]
Jahnentz et al.

[11] 4,018,621
[45] Apr. 19, 1977

[54] METHOD FOR REMOVING SLAG CAKES FROM SYNTHESIZING GAS REACTORS

[75] Inventors: Walter Jahnentz; Friedhard Klatt; Karl Gaupp, all of Marl, Germany

[73] Assignee: Chemische Werke Huls Aktiengesellschaft, Marl, Germany

[22] Filed: Apr. 11, 1975

[21] Appl. No.: 567,118

[30] Foreign Application Priority Data
Apr. 13, 1974  Germany .................... 2418033

[52] U.S. Cl. ........................... 134/5; 48/94; 48/DIG. 2; 134/24
[51] Int. Cl.² ............................................... B08B 7/00
[58] Field of Search ............ 134/5, 24; 266/38, 42; 48/94, 113, 69, DIG. 2; 201/2; 202/241, 252, 261; 65/27, 128

[56] References Cited
UNITED STATES PATENTS

| 1,968,053 | 7/1934 | Odell ...................................... 48/94 |
| 2,012,832 | 8/1935 | Rhein et al. ........................ 202/241 |
| 2,885,712 | 5/1959 | Shoulberg ....................... 202/241 X |
| 2,957,936 | 10/1960 | Bugge ............................... 266/38 X |
| 3,436,316 | 4/1969 | Lorrek ............................... 202/241 |
| 3,583,692 | 6/1971 | Urso ..................................... 266/38 |

Primary Examiner—S. Leon Bashore
Assistant Examiner—Richard V. Fisher
Attorney, Agent, or Firm—Gilbert L. Wells

[57] ABSTRACT

A method for removing slag cakes from synthesizing gas reactors. The seal at the bottom of the reactor is removed, an orifice is melted through the partially solidified slag cake by means of the flame of an oxygen core lance, the liquid slag is drained and the residual parts of the slag cake are liquified by means of an oxygen excess powered gas flame and allowed to drain. When the seal at the bottom of the reactor is in the form of a flat frustum of a cone and made of refractory material filled into a fixed refractory ring the method is facilitated.

5 Claims, 3 Drawing Figures

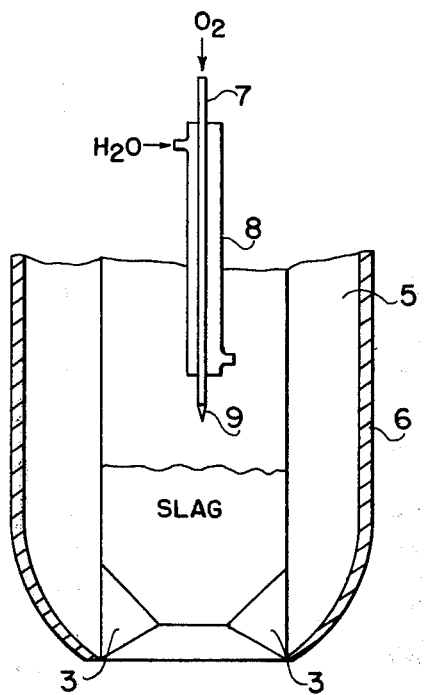
FIG. 3
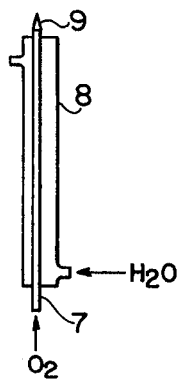

METHOD FOR REMOVING SLAG CAKES FROM SYNTHESIZING GAS REACTORS

BACKGROUND OF THE INVENTION

The present invention relates to a method and apparatus for removing slag cakes from synthesizing gas reactors.

The state of the art of manufactured gas may be ascertained by reference to the Kirk-Othmer "Encyclopedia of Chemical Technology", 2nd Edition, Vol. 10 (1966), pp. 353–442, particularly pages 426–430, in Ullmanns Encyklopedie der technischen Chemie, Vol. 16 (1965), pp. 626–628, in Chemical and Process Engineering, August 1970, pp. 53–57 or in Chemiker-Zeitung 96, pp. 123–134(1972) which disclose processes and apparatus operating at elevated pressure. These processes and apparatus are incorporated herein.

Mostly carbon monoxide and hydrogen are manufactured in synthesizing gas reactors by partially oxidizing heavy oil under pressure with oxygen. A slag deposits in the lower part of the reactor and must be periodically removed. Ordinarily this is done by stopping reactor operation and cooling, whereupon the reactor is opened at the bottom, the uncovered part of the ceramic lining is removed, and then the slag. Thereupon the reactor is sealed again by recasting the removed part of the lining and closing the reactor. The newly cast seal must be dried and annealed. This method requires inoperativeness of about 12 days, drying and annealing alone requiring about 7 days.

Several methods for removing slag from hot vessels or reactors are known. Thus tapping during operation is known in iron working technology. But reactors operating at high gas pressure will not allow opening during operation.

The Shell pressure gassifier is such a high gas pressure reactor and it is illustrated in Chemical and Process Engineering ibid, FIG. 4, p. 54, and the performance data are given on pages 55–57.

Even if the reactor were shut down and the pressure decreased, tapping through the ceramic refractory lining would be inapplicable because the slag inevitably would penetrate between the refractory layers and destroy this refractory. Furthermore, at ordinary reactor temperatures, only a layer of a few centimeters is liquid at the surface of the slag cake, the lower part already cooling and being solidified. Admixtures for liquefying the entire slag entail the risk that the ceramic refractory material too will be decomposed and destroyed.

It is further known how to cut substances of high melting points such as concrete by means of an oxygen core lance. However, the use of an oxygen core lance to melt slag cakes from synthesizing gas reactors so far is not known.

SUMMARY OF THE INVENTION

Having in mind the limitations of the prior art, it is an object of the present invention to develop a method allowing a reduction in the time required to remove slag cakes from synthesizing gas reactors and to resume reactor operation.

This object is achieved by the present invention in that following removal of the seal at the bottom of the reactor, an aperture is melted through the partly solidified slag cake, from above or from below, the liquid slag is drained, and a gas flame fed from excess oxygen melts the remaining part of the slag cake which is then also made to drain.

BRIEF DESCRIPTION OF THE DRAWINGS

The apparatus of the present invention may best be understood by reference to the figures illustrated in the drawing appended hereto, wherein:

FIG. 3 is an elevation view, partly in section, of a detailed showing of FIG. 2 showing the use of core lances with a water cooled jacketed pipe.

DESCRIPTION OF THE PREFERRED EMBODIMENTS

Figure 1:
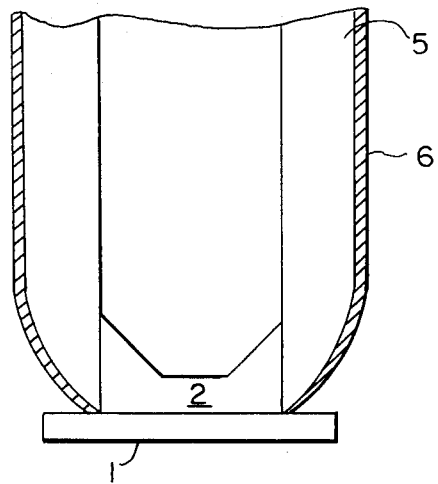
FIG. 1 is an elevation view, partly in section, of the pressure gassifier used in the present invention.
Figure 2:
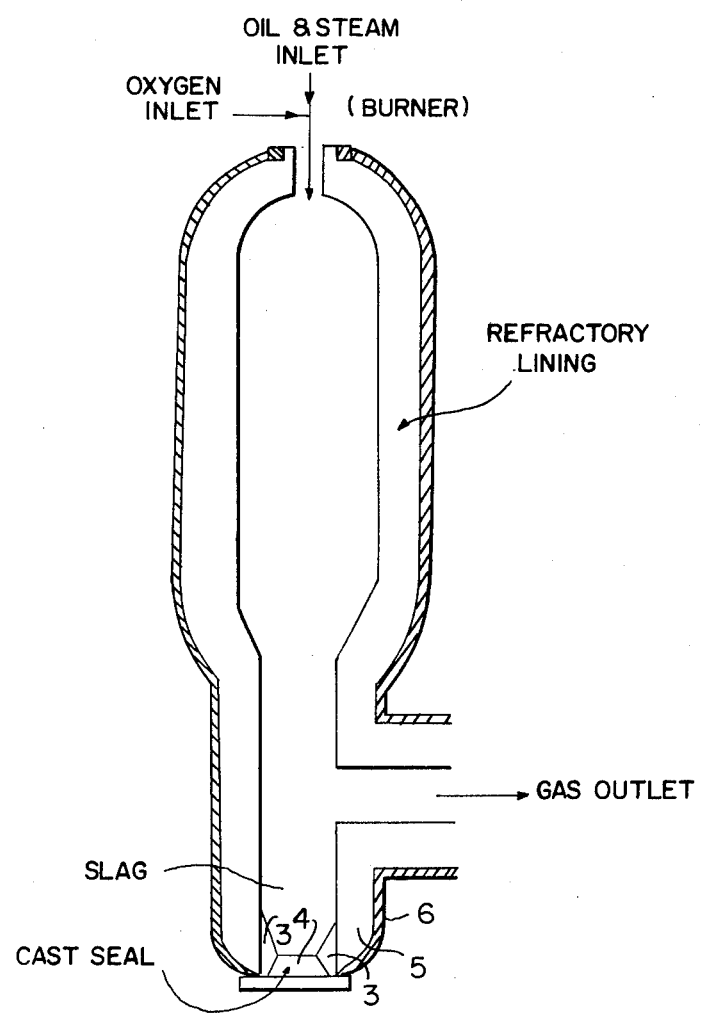
FIG. 2 is a detailed showing of FIG. 1 having a particular embodiment of the bottom seal.

The synthesizing gas reactor useful in the present invention is shown in FIG. 1, wherein the reactor has a refractory lining 5, a steel casing 6, a refractory seal 2 and a cover 1. FIG. 2 shows an improved embodiment having the seal made up of a flat frustum of a cone of refractory material 4 fitted into a fixed ring of refractory material 3.

FIG. 3 shows the core lances 7 with the water cooled jacketed pipe 8 having flames 9 at the end of the lances.

When the slag accumulating at the bottom of the reactor reaches an elevation slightly below the gas exhaust orifice, which in synthesizing gas reactors is mounted on the side of the lower part, the reactor is shut down and the pressure decreased. Without allowing the reactor to cool for any length of time, one first removes the cover 1 which closes the reactor. The refractory seal 2 also may be removed immediately by punching it out, since it is sufficiently cool in view of the insulating effect of the slag cake. Thereupon an orifice is melted by means of the flame of an oxygen core lance in the mostly solidified slag cake in accordance with the present invention.

If the melting takes place from above, the oxygen core lance, which is filled with steel or iron wires, is moved close to the surface of the slag. Preferably the lance is surrounded with a water-cooled jacketed pipe or with a suitable insulation up to half a meter above the slag, since otherwise it might melt or bend because of the reactor heat. The moment the lance tip reaches the ignition temperature, oxygen is blown into it. Following ignition, the lance is gradually pushed deeper into the melting slag while being kept a suitable distance away from the refractory.

When the slag cake is melted through from below, the oxygen core lance is conventionally ignited following heating by a welding torch and is pushed from below through the slag cake at a proper distance from the refractory.

In both procedures, when the melting is from above or from below, an orifice is obtained within a few minutes, which passes through all of the slag cake. Part of the slag then drains through this orifice, and is collected for instance in a sand bed. The lance is extinguished when the oxygen supply is shut off. Thereupon a gas burner is mounted preferably underneath the reactor by means of a suitable holding device. This gas burner is supplied with heating gas, natural gas, propane, hydrogen or another suitable fuel gas. It is important that an excess of oxygen be used to produce the gas flame (oxidizing flame).

When the flame is fueled with lack of oxygen (reducing flame), the ceramic refractory generally consisting of fully annealed aluminum oxide would be damaged. The remaining part of the slag cake is then molten by means of the gas burner flame. Any residual small adhering slag pieces if necessary may be removed mechanically.

As is shown by Example 1, following the method of the present invention saves two days with respect to the process of the state of the art, the latter requiring four days for cooling and punching out the slag. In the method of the present invention, on the other hand, all of the slag cake is removed within 1 day, whereupon only another day is required for cooling the refractory before the reactor may be resealed.

In accordance with the present invention, apparatus furthermore is used to facilitate the removal of slag cakes from synthesizing gas reactors, the seal at the bottom of the reactor being in the shape of a flat frustum of a cone 4 made of ceramic refractory material, being fitted into a fixed ring 3 also of refractory material.

In order to clarify the method obtained with the seal of the present invention alone, the advantages of this seal in the absence of the method of the present inventon are discussed below:

When the slag accumulating at the bottom of the reactor reaches a level slightly below the gas exhaust, reactor operation is stopped. First the cover 1 is removed to which the seal is fastened. Then the frustum of cone 4 is punched out according to the invention. The frustum of the cone 4 and the ring 3 together provide the original shape of the seal (part 2, FIG. 1). The angle between the base surface and the side surface appropriately amounts to about 15° to 45°. According to the present invention, the outer ring 3 is not punched out and provides enough of an orifice to allow removal of the slag.

Following slag removal, the reactor is sealed again by means of a prefinished, flat frustum of a cone previously dried and annealed, and is made tight by means of the cover 1 and thereupon operation is resumed.

As shown by Example 2 following, the seal of the present invention alone allows saving 6 days as compared to conventional methods because all of the 7 day drying and annealing period is eliminated, and on the other hand, another day being required to punch out the slag on account of the smaller evacuation orifice.

Very large progress is made when combining both components of the present invention, namely the use of the seal of the present invention and slag removal through melting by means of an oxygen core lance and a gas burner as disclosed in Example 3, following.

The additional saving in time is achieved in that the entire labor, both the removal of the slag and the restoration of the seal is carried out according to the present invention without deliberate cooling of the reactor. The inevitable cooling is so slight that the operational temperature is reached again in a few hours following termination of the labor.

As shown by Example 3, the saving in time amounts to ten days.

The process and equipment of the present invention may be applied to slag removal from synthesizing gas reactors, however application to similar reactors with similar formation of slag cakes melting at appreciably lower temperatures than the refractory, as is the case for the present invention, also is feasible.

The method and apparatus of the present invention surprisingly cuts to a high degree the time required to remove the slag and above all to restore the seal.

COMPARATIVE EXAMPLE

A synthesizing gas reactor (FIG. 1) is shut down when the slag level reaches 90 cm. Following two days cooling, the reactor is opened by removing cover 1 and the bared part of the material 2 is punched out, and thereupon the cooled slag is punched out, requiring another two days. Then the material to be punched out is formed again and the reactor is resealed and another day is required.

The newly cast refractory material is dried five days in a hot air flow, whereupon it is annealed following a heating sequence for two days.

Thereupon the reactor is operational again. The total time of inoperativeness is twelve days.

EXAMPLE 1

The same reactor as in Comparative Example is shut down. The lower part of the slag and the refractory seal 2 both are already cold enough during operation that the reactor may be opened at once, and refractory seal 2 may be punched out and half a day is required. A water cooled jacketed pipe is introduced from above to about one-half meter above the slag level. A core lance filled with steel or iron wires is introduced through this jacketed pipe to immediately above the slag surface. The slag temperature at the molten surface is still 1200°–1300° C. When the tip of the core lance reaches the ignition temperature, oxygen is blown into the core lance. Following ignition, the lance is gradually pushed deeper into the slag. In this manner the lance burns an orifice through the entire slag layer in a few minutes. About two-thirds of all the slag pours out and downward through this orifice and the molten slag is caught in a sand bed. The lance is extinguished by shutting off the oxygen supply. After draining of the liquid slag, a gas burner is mounted underneath the reactor by means of an appropriate holding device and the remainder of the slag is melted by means of heating gas and excess oxygen. Minor slag residues adhering in the neighborhood of the reactor opening are knocked off. One day is required to remove the slag when the process is applied. The reactor must be cooled another day before the seal may be restored by casting a new material which later must be stamped out again.

Restoration of the seal takes place as in the comparison example and requires again 8 days for drying and annealing, so that the total inoperative time of the reactor amounts to 10 days.

The saving in time as compared with the conventional process in this procedure amounts to two days.

EXAMPLE 2.

A syntheizing gas reactor provided with a seal according to the present invention (FIG. 2) is shut down when the slag level reaches 90 cm. Following removal of cover 1, part 4 of the refractory material in the form of a flat frustum of a cone is punched out. Ring 3 remains intact. The required labor in this case amounts to one-half a day.

Thereupon the slag is punched out through the opened clearing. This work must be periodically interrupted to allow further cooling of the slag inside the slag cake.

Four working days are required for the punching out phase. Upon termination of slag removal, a new and previously dried and annealed sealing stopper 4 is installed and the reactor is closed again by means of cover 1. This work requires half a day.

Prior to resuming operation, the reactor is raised to operational temperature within one day.

Thus the total time of reactor shut down amounts to 6 days, the saving in time with respect to conventional processes being 6 days.

EXAMPLE 3.

The same reactor as in Example 2 is shut down. Opening and uncovering of slag cake takes place as in Example 2 in half a day.

An oxygen core lance is conventionally ignited by a welding torch and supplied with oxygen. This lance then is introduced from the bottom in the approximate center of the uncovered slag cake and gradually pushed upward. After a few minutes a hole has been burned through the solidified part of the slag cake, so that the liquid part may drain. The liquid slag is caught in a sand bed. As described in Example 1, the lance is extinguished, a gas burner is mounted underneath the reactor, and the remainder of the slag is melted within about 2 hours by means of a gas flame and excess oxygen. Minor slag residues in the vicinity of the orifice 3 are knocked off, and the reactor, as described in Example 2, is sealed again with a prefinished sealing stopper 4 and this takes half a day. The reactor having dropped only slightly in temperature during the entire procedure, operational temperature may be reached again within half a day.

Total shut-down of the reactor hence amounts to 2 days, a saving of 10 days,

We claim:

1. A method for removing a slag cake formed in the bottom of a synthesizing gas reactor having a reactor cover located on the bottom of the reactor, comprising:
   a. removing said reactor cover;
   b. melting an orifice through said slag cake and the bottom of the reactor with said reactor cover removed by means of a flame from an oxygen core lance to form liquefied slag;
   c. draining said liquefied slag through said orifice;
   d. liquefying residual parts of said slag cake by means of an oxygen excess powered gas flame; and
   e. draining said liquefied residual parts through said orifice.

2. The method of claim 1, further comprising (f) the step of resealing by locating a seal at the bottom end of the reactor and replacing the reactor cover thereover, said seal comprising a flat frustum of a cone made of refractory material and fitted into a fixed ring of refractory material.

3. The method of claim 2, wherein said step of melting an orifice is carried out from above said seal after said cover is removed.

4. The method of claim 2, wherein said step of melting an orifice is carried out from below said seal after said cover is removed.

5. The method of claim 3, further comprising the step of cooling said oxygen core lance by surrounding it with a water-cooled jacketed pipe.

* * * * *